Aug. 25, 1925.

F. D. CHAPMAN 1,551,133

AUTOMATIC PRESSURE COOKER

Filed March 19, 1923     2 Sheets-Sheet 2

INVENTOR.
Frank D. Chapman.
BY
Morsell, Keeney & Morsell
ATTORNEYS.

Patented Aug. 25, 1925.

1,551,133

UNITED STATES PATENT OFFICE.

FRANK D. CHAPMAN, OF BERLIN, WISCONSIN, ASSIGNOR TO BERLIN-CHAPMAN COMPANY, OF BERLIN, WISCONSIN, A CORPORATION OF WISCONSIN.

AUTOMATIC PRESSURE COOKER.

Application filed March 19, 1923. Serial No. 626,122.

*To all whom it may concern:*

Be it known that I, FRANK D. CHAPMAN, a citizen of the United States, and resident of Berlin, in the county of Green Lake and State of Wisconsin, have invented new and useful Improvements in Automatic Pressure Cookers, of which the following is a description, reference being had to the accompanying drawings, which are a part of this specification.

This invention relates to improvements in automatic pressure cookers, more particularly adapted for cooking food in cans, and also for loading and unloading the cans to and from the cooker.

In pressure cookers or sterilizers for cooking food in cans, it is desirable to provide for controlling the temperature, the agitation and the time period during the cooking process. Some foods require agitation during a portion of the cooking period and rest the remaining period, while some foods require constant agitation and others not any.

It is one of the objects of the present invention to provide an automatic pressure cooker having all of the above mentioned desirable features combined in a very simple manner.

A further object of the invention is to provide an automatic pressure cooker having a novel means for advancing the food cans from the intake opening to the outlet opening which at the same time coacts to agitate the cans to the extent desired.

A further object of the invention is to provide an automatic cooker in which the period of the agitation of the cans may be controlled in a very simple manner.

A further object of the invention is to provide an automatic pressure cooker in which the buoyancy of the cans coacts with the level of the heat transmitting medium in determining the degree of agitation of the cans during the cooking period.

A further object of this invention is to provide an automatic pressure cooker in which the cans in the reels are in adjustable endwise contact with one another and under slight pressure end to end, and in which the said endwise pressure may be relieved in discharging the cans.

A further object of the invention is to provide an automatic pressure cooker in which the rotary drum or can moving member carries the cans at an angle to the axis of rotation so they will frictionally coact with the inner surface of the drum and advance the cans longitudinally with relation to the tank.

A further object of the invention is to provide an automatic pressure cooker having means for deflecting cans outwardly through the discharge opening which is controlled from the exterior of the tank.

A further object of the invention is to provide an automatic cooker having an outlet opening arranged to discharge the cans in a sidewise position so they can be easily handled by other mechanism for further treatment.

A further object of the invention is to provide an automatic cooker which is of simple construction, is strong and durable and is well adapted for the purpose described.

With the above and other objects in view, the invention consists of the improved automatic pressure cooker and its parts and combinations as set forth in the claims, and all equivalents thereof.

In the accompanying drawings in which the same reference characters indicate the same parts in all of the views:

Fig. 4 is a side view of a portion of the tank indicating by dotted line the path of travel of the cans while charging or discharging the tank; and Fig. 5 is a fragmentary side view of the discharge portion of the tank showing the discharge can lever in both positions.

Figure 1:
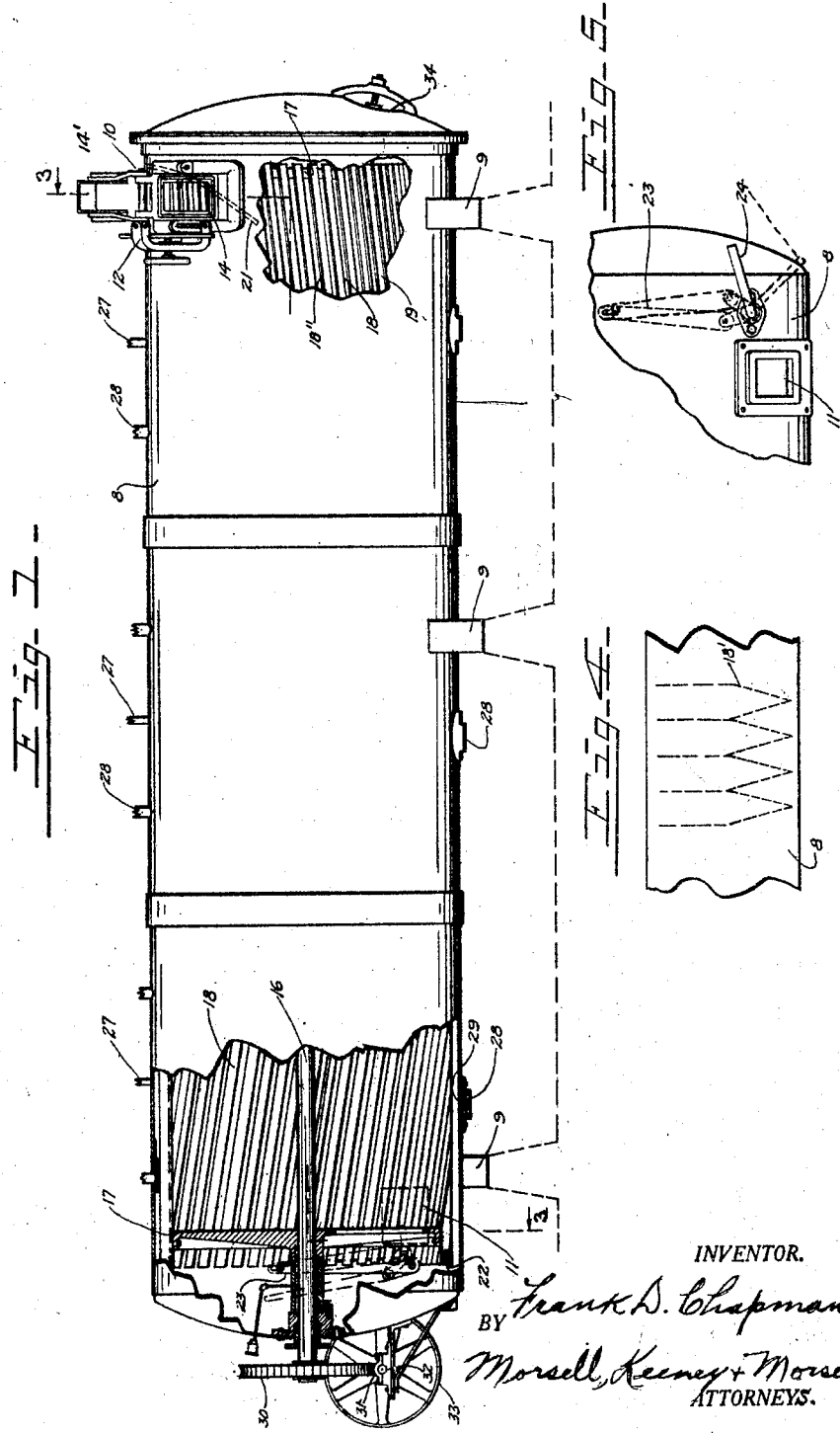
Fig. 1 is a side view of the improved automatic pressure cooker, parts broken away and other parts shown in section to show the interior construction.

Referring to the drawings, the numeral 8 indicates a tank which extends horizontally and is supported by legs 9 in any manner desired. The tank is closed at both ends and is provided with a side inlet opening 10 adjacent its upper front end and a side discharge opening 11 near its lower rear end. Both openings are closed by doors or covers 12 and 13 which may be connected in any manner desired to form sealed closures for the openings. The cover 13 when in closed position, forms a smooth interior surface in order not to obstruct the cans during the processing. Said openings are also provided with can inlet and outlet tracks or guides 14 and 15 respectively, which are preferably hinged to the tank so they can be swung to one side when the openings are closed and sealed during the cooking period.

A shaft 16 journaled in the tank and extending through one end thereof is provided with opposite heads 17 to which are connected longitudinal and spirally trending bars 18 of angular form in cross section to form a can reel. The inner angles 18' of the bars 18 extend circumferentially while the outer angles 18" extend radially to form uninterrupted pockets 19 of elongated and slightly spirally trending form, or in other words, the outer angles extend only partly around the reel. The bars 18 are spaced from the inner surface of the wall of the tank a less distance than the diameter of the food cans 20 so that said cans cannot pass therebetween. The cans in dropping into the pockets from the inlet opening will be positively engaged by an inlet cam 21 which slides the cans endwise a distance slightly greater than the length of the can to permit a continuous feed of cans to the tank while charging same. When the cans drop into the pockets they rest upon the inner flanges of the bars of the reel until the radial flanged portions of the bars 18 incline downwardly at a point below the horizontal plane of the reel axis. When this point is reached, the cans will roll radially outwardly and into frictional engagement with the inner surface of the tank and this engagement will cause the cans to roll or turn as they are carried around by the reel. As before mentioned, the bars extend spirally and the cans will be likewise maintained with the result that as they are rolled circumferentially approximately one half of each revolution of the reel, the cans will be moved endwise in the elongated pockets, the movement being indicated by dotted lines 18', Fig. 4. Preferably the bars are arranged to advance the cans endwise slightly more than the length of a can for each revolution of the reel to permit a constant feed during the charging operation.

The end portion of each bar adjacent the discharge end of the tank is provided with an adjustable stop screw or bolt 22 to adjustably limit the endwise movement of the cans so they will be in position to be easily discharged during the discharging operation.

The discharge end of the tank is also provided with a discharge cam lever 23 which is controlled by an arm 24 located outside of the tank. The cam lever is so located that when swung into discharging position, as indicated by full lines, the cans will be forced backwardly to relieve end pressure and be directed to aline with the discharge opening and the cans will roll out through said opening and on the outlet track 15. Said outlet track is provided with an upwardly curved inner end 15' to catch the cans in dropping from the pockets and is also provided with a yielding member 25 for directing the cans to the curved portion and prevent more than one can at a time discharging.

A yielding gate member 26 is carried by the side bars 14' of the inlet gate or guide 14 to direct the cans into the pockets.

The upper and lower portions of the tank are provided with steam and water inlet pipes 27 and 28, respectively, which provide for charging the tank with water and heating the water with the steam. The upper pipes 28 may be used for spraying water into the tank while the lower pipes 28 are also adapted to discharge the water from the tank. To provide a smooth interior surface for the cans to roll on, the water and other openings in the lower portion of the tank are covered with perforated plates 29.

A worm wheel 30 mounted on the outer end of the shaft 16 is in mesh with a worm 31 mounted on a transverse shaft 32 and said shaft 32 is provided with a belt pulley 33 for connection with a source of power.

For all practical purposes, a can of food displaces but little more than its weight in water, with the result that if the tank is half filled with water the cans will not engage the inner surface of the tank with sufficient friction to rotate the can while being carried around the drum by the reel, so that by varying the height of the level of the water the cans may be caused to rotate a predetermined extent before they are submerged in the water, thus permitting the control of the amount of agitation during the cooking process and the speed of travel through the tank. For convenience in gaining access to the tank, a manhole and cover 34 are provided.

While the construction is shown and described as a pressure cooker, it may also be used in what is termed an atmospheric pressure or open cooker.

Figure 2:
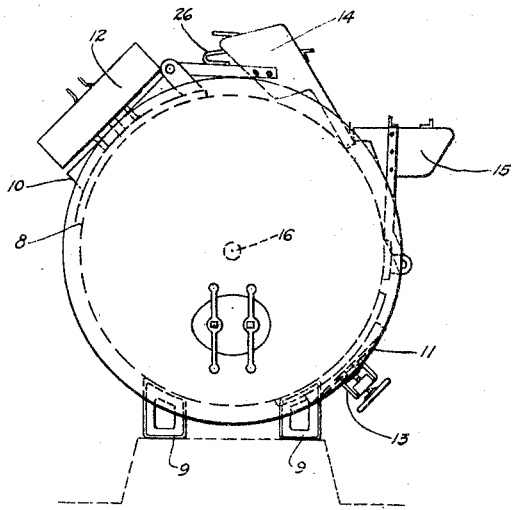
Fig. 2 is a front view thereof.
Figure 3:
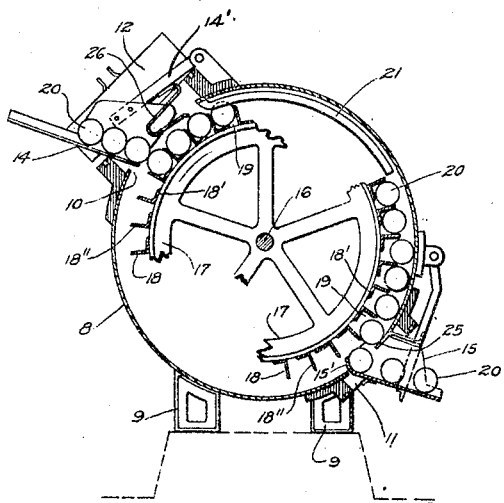
Fig. 3 is a vertical section view taken on line 3—3 of Fig. 1.

In operation, the cans are directed into the intake opening by the intake track while the reel is rotating, with the result that the engagement of the cans with the inner lower half portion of the tank will work the cans endwise and completely fill the tank. The tracks are now swung outwardly to the position shown in Fig. 2, and the doors or covers 12 and 13 are clamped in position to form a steam tight joint. The tank is now filled with water to the desired level and the steam is turned on to get the desired pressure and heat. The reel is now rotated to subject all of the cans to the same temperature during the cooking process, and during this period the cans may be agitated to any extent desired by raising or lowering the level of the water in the tank. When the cooking process is completed, the steam is closed off and the water discharged from the tank, and the discharge door is removed. The discharge track and the cam lever are now swung into position and the reel is rotated to discharge the cans in successive order.

From the foregoing description it will be seen that the automatic pressure cooker provides a very simple means for advancing the cans longitudinally and which means permits control of the agitation of the cans. The cooker also provides novel means for charging and discharging the cans to and from the tank.

What I claim as my invention is:

1. An automatic pressure cooker, comprising a horizontal tank having an inlet opening adjacent one end and an outlet opening adjacent its opposite end, and a reel positioned within the tank and having slightly spirally trending bars forming pockets which extend uninterruptedly from approximately one end of the reel to the other for receiving cans from the inlet opening, said bars coacting with the inner curved surface of the tank in advancing the cans in the pockets from the inlet opening to the outlet opening thereof.

2. An automatic pressure cooker, comprising a horizontal tank having an inlet opening in its upper portion adjacent one end and an outlet opening in its lower portion adjacent its other end, means for closing said openings, and a reel journaled in the tank and having slightly spirally trending bars forming pockets which extend uninterruptedly from approximately one end of the reel to the other for receiving cans from the inlet opening, said bars coacting with the inner surface of the tank in advancing the cans in the pockets from the inlet opening to the outlet opening thereof.

3. An automatic pressure cooker, comprising a fixed horizontal tank having an inlet opening in its upper peripheral portion adjacent one end and an outlet opening in its lower peripheral portion adjacent its other end, means for closing said openings, and a reel journaled in and concentric with the tank and having slightly spirally trending longitudinal bars forming elongated pockets which extend uninterruptedly from approximately one end of the reel to the other for receiving cans and advancing said cans from the inlet opening to the outlet opening by a rolling contact with a portion of the inner surface of the tank and a sliding engagement with the bars.

4. An automatic pressure cooker, comprising a tank having a reel provided with slightly spirally trending longitudinal pockets for receiving and moving cans longitudinally by a frictional engagement of the cans with the inner surface of the tank and a sliding engagement with the reel.

5. An automatic pressure cooker, comprising a tank having a concentric reel with slightly spiral longitudinally extending pockets for receiving and moving cans into frictional contact with the inner surface of the tank and slidingly in the pockets to move the cans longitudinally.

6. An automatic pressure cooker, comprising a tank of circular form in cross section and having an inlet and an outlet opening and a comparatively smooth interior surface, and a concentric reel journaled in the tank and having slightly spirally trending and longitudinally extending pockets for receiving and moving cans into frictional contact with the inner surface of the tank and slidingly in the pockets to move the cans longitudinally from the inlet to the outlet opening.

7. An automatic pressure cooker, comprising a tank of circular form in cross section and having an inlet and an outlet opening and a comparatively smooth interior surface, and a concentric reel journaled in the tank and having slightly spirally trending and longitudinally extending pockets for receiving and moving cans into frictional contact with the lower half portion of the inner surface of the tank and slidingly in the pockets to move the cans longitudinally from the inlet to the outlet opening.

8. An automatic pressure cooker, comprising a tank of circular form in cross section, and a reel journaled concentrically in the tank and having means coacting with the inner surface of the tank for moving cans spirally during certain periods of each revolution and circumferentially during the remaining portion of each revolution for conveying the cans from one end portion of the tank to the other.

9. An automatic pressure cooker, comprising a horizontally extending tank of circular form in cross section and having an upper inlet opening and a lower outlet opening, a reel journaled in the tank and having spirally trending pockets for receiving cans from the inlet opening and normally moving them circumferentially into frictional contact with the inner surface of a portion of the tank to advance the cans longitudinally, and means controlling the period of can contact and agitation and the speed of longitudinal advancement of the cans.

10. An automatic pressure cooker, comprising a horizontally extending tank of circular form in cross section and having an upper inlet opening and a lower outlet opening, a reel journaled in the tank and having spirally trending pockets for receiving cans from the inlet opening and normally moving them circumferentially into frictional contact with the inner surface of a portion of the tank to advance the cans longitudinally, and liquid means controlling the period of can contact and agitation and the speed of longitudinal advancement of the cans.

11. An automatic pressure cooker, comprising a horizontally extending tank of circular form in cross section and having an upper inlet opening and a lower outlet opening, means for closing said openings, a reel journaled in the tank and having spirally trending pockets for receiving cans from the inlet opening and normally moving them circumferentially into frictional contact with the inner surface of a portion of the tank to advance the cans longitudinally, and means controlling the level of a liquid in the tank for controlling the period of can contact and agitation and the speed of longitudinal advancement of the cans.

12. An automatic pressure cooker, comprising a horizontally extending tank of circular form in cross section and having an upper inlet opening and a lower outlet opening, means for closing said openings, and a reel journaled concentrically in the tank and having slightly spirally trending and longitudinally extending pockets for receiving cans from the inlet opening and moving them into rolling contact with the inner surface of the lower portion of the tank and slidingly with the side walls of the pockets to agitate the contents of the cans and move the cans longitudinally.

13. An automatic pressure cooker, comprising a horizontally extending tank of circular form in cross section and having an upper inlet opening and a lower outlet opening, means for closing said openings, a reel journaled concentrically in the tank and having spirally trending pockets for receiving cans from the inlet opening and normally moving them into rolling contact with the inner surface of a portion of the tank to agitate the contents of the cans, and means controlling the period of rolling contact of the cans with the tank surface to control the degree of agitation of the contents of the cans.

14. An automatic pressure cooker, comprising a horizontally extending tank of circular form in cross section and having an upper inlet opening and a lower outlet opening, means for closing said openings, a reel journaled concentrically in the tank and having spirally trending pockets for receiving cans from the inlet opening and normally moving them into rolling contact with the inner surface of a portion of the tank to agitate the contents of the cans and means controlling the level of a liquid in the tank for controlling the period of rolling can contact and the agitation of the contents of the cans.

15. An automatic pressure cooker, comprising a horizontal tank having an inlet opening in its upper portion adjacent one end and an outlet opening in its lower portion adjacent its other end, means for closing said openings, a reel journaled in the tank and having spirally trending bars forming pockets coacting with the tank for receiving cans from the inlet opening and advancing them longitudinally until the tank is charged and then rotating the cans without advancing during a portion of each revolution of the reel to agitate the contents of the cans and then again advancing the cans longitudinally to discharge them through the discharge opening, means for feeding cans to the inlet opening, means for receiving cans from the discharge opening, means for supplying a heating fluid to the tank, and means for supplying a liquid to the tank and controlling its level to control the degree of agitation of the contents of the cans.

16. An automatic pressure cooker, comprising a horizontal tank having an inlet opening in its upper portion adjacent one end and an outlet opening in its lower portion adjacent its other end, means for closing said openings, a reel journaled in the tank and having spirally trending angle bars forming pockets coacting with the tank for receiving cans from the inlet opening and advancing them longitudinally until the tank is charged and then rotating the cans without advancing during a portion of each revolution of the reel to agitate the contents of the cans and then again advancing the cans longitudinally to discharge them through the discharge opening, positive means for moving the incoming cans longitudinally a predetermined distance, means for feeding cans to the inlet opening, means for receiving cans from the discharge opening, means for supplying a heating fluid to the tank, and means for supplying a liquid to the tank and controlling its level to control the degree of agitation of the contents of the cans.

17. An automatic pressure cooker, comprising a horizontal tank having an inlet opening in its upper portion adjacent one end and an outlet opening in its lower portion adjacent its other end, means for closing said openings, a reel journaled in the tank and having spirally trending angle bars forming pockets coacting with the tank for receiving cans from the inlet opening and advancing them longitudinally until the tank is charged and then rotating the cans without advancing during a portion of each revolution of the reel to agitate the contents of the cans and then again advancing the cans longitudinally to discharge them through the discharge opening, positive means for moving the incoming cans longitudinally a predetermined distance, means for feeding cans to the inlet opening, means for receiving cans from the discharge opening, means for positively discharging cans through the discharge opening, means for supplying a heating fluid to the tank, and means for supplying a liquid to the tank and controlling its level to control the degree of agitation of the contents of the cans.

18. An automatic pressure cooker, comprising a horizontal tank having an inlet opening in its upper portion adjacent one end and an outlet opening in its lower portion adjacent its other end, means for closing said openings, a reel journaled in the tank and having spirally trending angle bars forming pockets coacting with the tank for receiving cans from the inlet opening and advancing them longitudinally until the tank is charged and then rotating the cans without advancing during a portion of each revolution of the reel to agitate the contents of the cans and then again advancing the cans longitudinally to discharge them through the discharge opening, positive means for moving the incoming cans longitudinally a predetermined distance, means for feeding cans to the inlet opening, means for receiving cans from the discharge opening, means controlled exteriorly of the tank for positively discharging cans through the discharge opening, means for supplying a heating fluid to the tank, and means for supplying a liquid to the tank and controlling its level to control the degree of agitation of the contents of the cans.

19. A cooker, comprising a horizontal tank for receiving a heating medium, a reel positioned within the tank and having slightly spirally trending and longitudinally extending uninterrupted pockets for receiving cans for coaction with the tank to advance the cans longitudinally in the tank and slidingly in the pockets.

20. A cooker, comprising a horizontal tank for receiving a heating medium, a reel positioned within the tank and having slightly spirally trending and longitudinally extending uninterrupted pockets for receiving cans which frictionally engage the inner surface of the tank to advance the cans longitudinally in the tank and slidingly in the pockets.

21. A cooker, comprising a tank having a slightly spiral reel therein for receiving and moving cans longitudinally by a sidewise engagement of the cans with the inner surface of the tank and a sliding sidewise engagement with the reel.

22. A cooker, comprising a tank having a slightly spiral reel therein for receiving and moving cans longitudinally by a sidewise engagement of the cans with the inner surface of the tank, and other means for moving the cans longitudinally to permit the free discharge of the cans.

23. A cooker, comprising a tank having a spiral reel therein for receiving and moving cans longitudinally by a sidewise engagement of the cans with the inner surface of the tank, and means controlled exteriorly of the tank for moving the cans longitudinally to permit the free discharge by gravity of the cans.

24. A cooker, comprising a tank having a spiral reel therein for receiving and moving cans longitudinally by a sidewise engagement of the cans with the inner surface of the tank, and cam means controlled exteriorly of the tank for moving the cans longitudinally to permit the free discharge by gravity of the cans.

25. A cooker, comprising a tank having a spiral reel therein for receiving and moving cans longitudinally by a sidewise engagement of the cans with the inner surface of the tank, a cam positioned within the tank for engaging the end can of each longitudinal line of cans for moving the cans endwise to permit the free discharge by gravity of the cans, and means exteriorly of the tank for controlling the position of the cam.

In testimony whereof, I affix my signature.

FRANK D. CHAPMAN.